United States Patent
Kitano

(10) Patent No.: US 6,501,373 B2
(45) Date of Patent: Dec. 31, 2002

(54) APPARATUS AND METHOD FOR ALARMING DECREASE IN TIRE AIR-PRESSURE

(75) Inventor: Masashi Kitano, Kobe (JP)

(73) Assignees: Sumitomo Rubber Industries, Ltd., Hyogo-ken (JP); Sumitomo Electric Industries, Ltd., Osaka-fu (JP)

( * ) Notice: Subject to any disclaimer, the term of this patent is extended or adjusted under 35 U.S.C. 154(b) by 0 days.

(21) Appl. No.: 09/984,907

(22) Filed: Oct. 31, 2001

(65) Prior Publication Data

US 2002/0053971 A1 May 9, 2002

(30) Foreign Application Priority Data

Oct. 31, 2000 (JP) .................................. 2000-333595

(51) Int. Cl.⁷ .............................................. B60C 23/00
(52) U.S. Cl. ...................... 340/444; 340/448; 73/146.2; 701/36
(58) Field of Search ................................ 340/442, 444, 340/448; 73/146.2, 146.5; 701/36

(56) References Cited

U.S. PATENT DOCUMENTS

| | | | | |
|---|---|---|---|---|
| 5,710,539 A | * | 1/1998 | Iida | 340/444 |
| 5,939,626 A | * | 8/1999 | Tominaga et al. | 340/444 |
| 6,064,936 A | * | 5/2000 | Nakajima | 340/442 |
| 6,269,289 B1 | * | 7/2001 | Toukura et al. | 73/146 |
| 6,388,568 B1 | * | 5/2002 | Arita et al. | 340/442 |
| 6,407,661 B2 | * | 6/2002 | Arita et al. | 340/444 |
| 6,420,966 B2 | * | 7/2002 | Sugisawa | 340/442 |

FOREIGN PATENT DOCUMENTS

JP 9-156327 6/1997

\* cited by examiner

*Primary Examiner*—Daniel J. Wu
(74) *Attorney, Agent, or Firm*—Birch, Stewart, Kolasch & Birch, LLP

(57) ABSTRACT

An apparatus for alarming decrease in tire air-pressure comprising: a rotational information detecting means for detecting rotational information of the respective tires; a rotational information memory means; a judged value calculating means for calculating judged values based on the rotational information; a judged value memory means; a transition calculating means for calculating transition of the judged values based on the stored judged values; a judging means for determining a decrease in tire air-pressure; and an alarming means for issuing preliminary alarm prior to issuing a predetermined alarm for informing decrease in internal pressure in case the judged value tends to move to exceed a predetermined threshold. It is possible to appropriately inform the driver of the vehicle of a decompressed condition of a tire for making the driver drive safely.

6 Claims, 4 Drawing Sheets

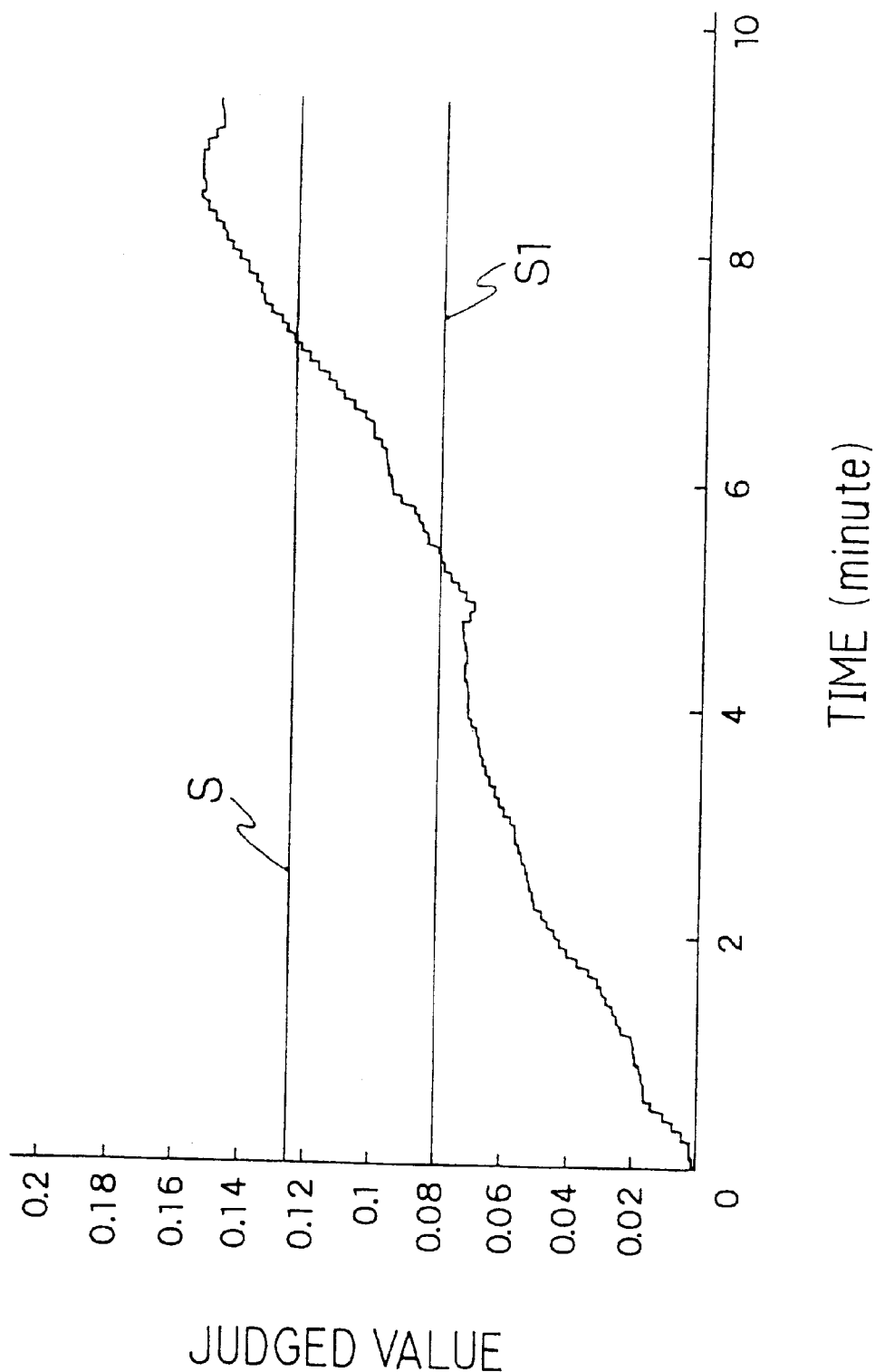

APPARATUS AND METHOD FOR ALARMING DECREASE IN TIRE AIR-PRESSURE

BACKGROUND OF THE INVENTION

The present invention relates to an apparatus and method for alarming decrease in tire air-pressure. More particularly, the present invention relates to an apparatus and method for alarming decrease in tire air-pressure capable of properly informing a decompressed condition of a tire to a driver of a vehicle such that the driver can drive safely.

It is conventionally known for a system for alarming decrease in tire air-pressure (DWS) for detecting decompression of a tire based on rotational (wheel speed) information of four wheels. Such a system is based on the theory that a rotational velocity or rotational angular velocity of a decompressed tire is increased when compared to that of other normal tires since its outer diameter (dynamic load radius of the tire) is. decreased in contrast to tires of normal internal pressure. In a method for detecting decrease in internal pressure on the basis of a relative difference of rotational angular velocities of tires (refer to Japanese Unexamined Patent Publication No. 305011/1988), a judged value DEL is defined as follows:

$$DEL = \{(F1+F4)/2 - (F2+F3)/2\} / \{(F1+F2+F3+F4)/4\} \times 100 (\%)$$

In case the judged value exceeds a threshold which has preliminarily been properly adjusted, the driver is informed of a decrease in internal pressure. Here, F1 to F4 indicate rotational angular velocities of a front left tire, a front right tire, a rear left tire and a rear right tire, respectively. In such a method, in case the threshold is so adjusted that decompression of a tire by 30% from a normal internal pressure is surely detected, the driver is alarmed of decompression in case the internal pressure has decreased by approximately 30%.

In case adjustments are performed to detect decompression of the internal pressure of a tire by 30% in the conventional method, no information is supplied to the driver until decompression has progressed to 30%. That is, no information is given until the set threshold has been exceeded. If the driver would be informed of a decompressed condition in which the decompression gradually progresses or decompression has progressed to 20%, it can be prevented that a sudden alarm causes anxieties to the driver but the driver could perform safe driving and could accordingly arrange for repair of the tire in question.

The present invention has been made in view of the above circumstances, and it is an object thereof to provide an apparatus and method for alarming decrease in tire air-pressure capable of properly informing a decompressed condition of a tire to a driver of a vehicle such that the driver might drive safely.

SUMMARY OF THE INVENTION

In accordance with the present invention, there is provided an apparatus for alarming decrease in tire air-pressure for alarming decrease in tire air-pressure based on rotational information obtained from tires attached to a vehicle, comprising: a. rotational information detecting means for detecting rotational information of the respective tires; a rotational information memory means for storing the rotational information of the respective tires; a judged value calculating means for calculating judged values based on the rotational information of the respective tires; a judged value memory means for storing the judged values; a transition calculating means for calculating transition of the judged values based on the stored judged values; a judging means for determining a decrease in tire air-pressure based on the judged values; and an alarming means for issuing preliminary alarm prior to issuing a predetermined alarm for informing decrease in internal pressure based on the transition of the judged values in case the judged value tends to move to exceed a predetermined threshold for determining a decrease in internal pressure.

In accordance with the present invention, there is further provided a method for alarming decrease in tire air-pressure based on rotational information obtained from tires attached to a vehicle, comprising the steps of: detecting rotational information of the respective tires; storing the rotational information of the respective tires; calculating judged values based on the rotational information of the respective tires; storing the judged values; calculating transition of the judged values based on the stored judged values; determining a decrease in tire air-pressure based on the judged values; and issuing preliminary alarm prior to issuing a predetermined alarm for informing decrease in internal pressure based on the transition of the judged values in case the judged value tends to move to exceed a predetermined threshold for determining a decrease in internal pressure.

BRIEF DESCRIPTION OF THE DRAWINGS

FIG. 4 is a diagram illustrating transition in judged values.

DETAILED DESCRIPTION

The apparatus and method for alarming decrease in tire air-pressure according to the present invention will now be explained in details with reference to the accompanying drawings.

Figure 1:
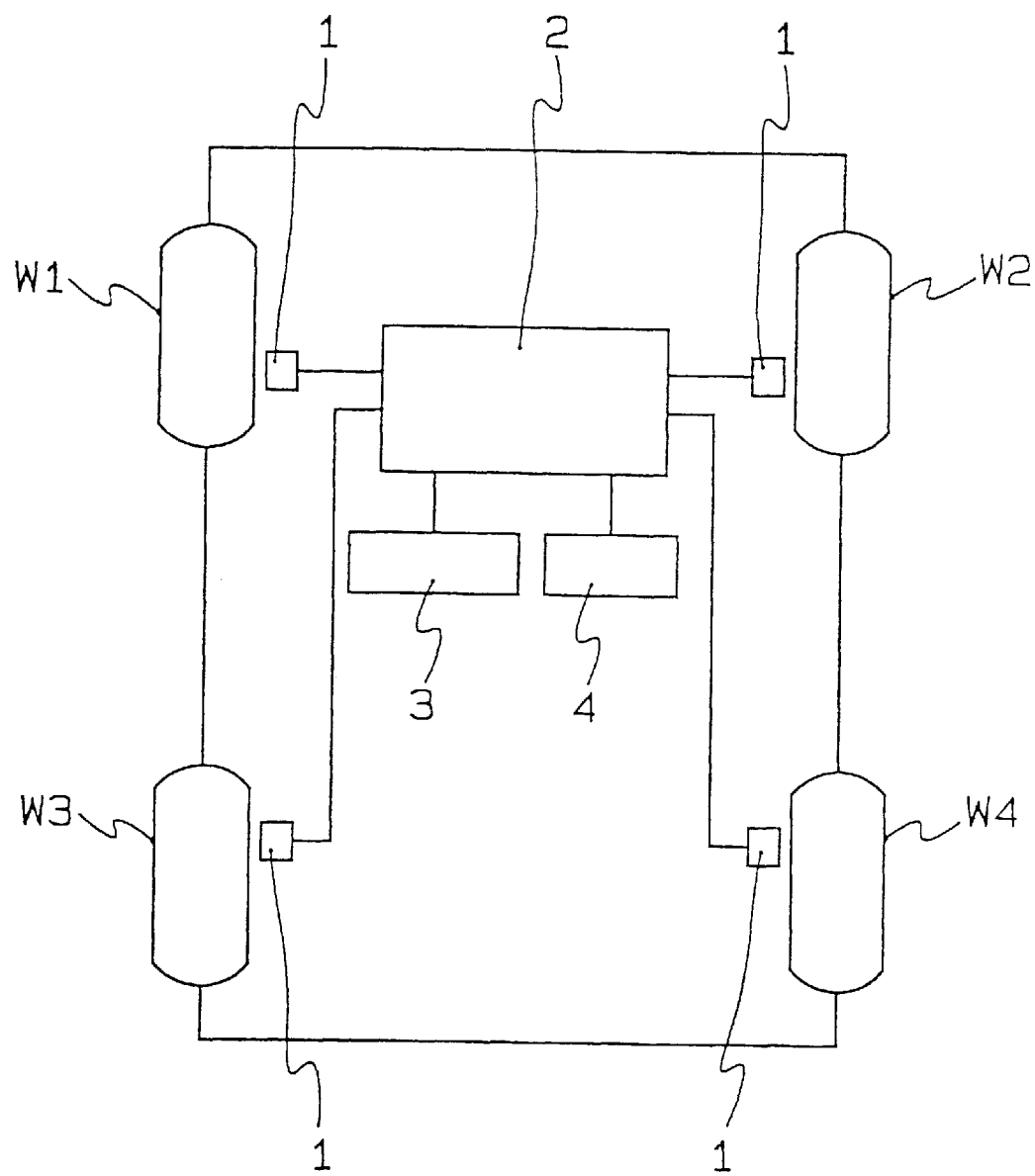
FIG. 1 is a block diagram illustrating one embodiment of the apparatus for alarming decrease in tire air-pressure according to the present invention.

As shown in FIG. 1, the apparatus for alarming decrease in air-pressure is for detecting whether an air-pressure of any of four wheels W1, W2, W3 and W4 (W1: front left tire, W2: front right tire, W3: rear left tire, and W4: rear right tire. Hereinafter, referred generally to Wi) attached to a four-wheeled vehicle has decreased or not, and comprises rotational information detecting means 1, which is an ordinary wheel speed sensor, respectively arranged in connection with each of the tires Wi. The rotational information detecting means 1 is not particularly limited in the present invention so long as it can detect a rotational information, for example, number of revolution, rotational speed, angular velocity or the like of each of the tires. The rotational information detecting means 1 might be a wheel speed sensor for generating rotational pulse by using an electromagnetic pickup or similar device to obtain wheel speeds (rotational speeds) on the basis of the number of pulses, or an angular velocity sensor including those in which electricity is generated by utilizing rotation such as a dynamo to obtain the wheel speed on the basis of the voltage thereof. Outputs of the rotational information detecting means 1 are supplied to a control unit 2 such as an ABS.

To the control unit 2, there are connected a display means 3, which is an alarming means, composed of liquid crystal display elements, plasma display elements, or CRT for informing a tire Wi of which air-pressure has decreased, and an initialization switch 4 which might be operated by the driver.

Figure 2:
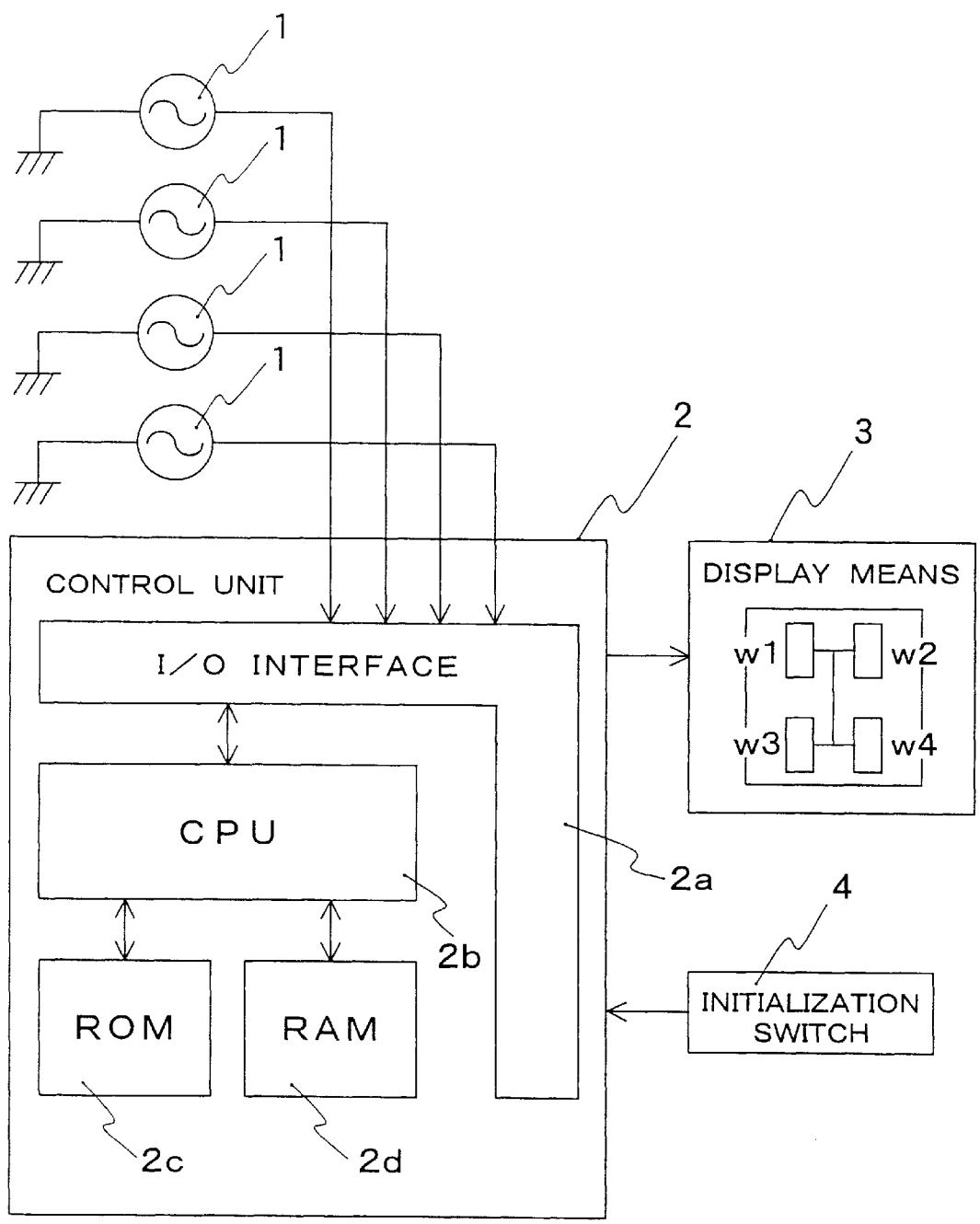
FIG. 2 is a block diagram illustrating electric arrangements of the apparatus for alarming decrease in tire air-pressure in FIG. 1.

The control unit 2 comprises, as shown in FIG. 2, an I/O interface 2a required for sending/receiving signals to/from an external device, a CPU 2b which functions as a center of calculation, a ROM 2c which stores a control operation program for the CPU 2b, and a RAM 2d into which data are temporally written and are read out therefrom when the CPU 2b performs control operations.

In the present embodiment, the apparatus comprises a rotational information detecting means for detecting rotational information of the respective tires, a rotational information memory means for storing the rotational information of the respective tires, a judged value calculating means for calculating judged values based on the rotational information of the respective tires, a buffer for accumulating judged values which is a judged value memory means for storing the judged values, a transition calculating means for calculating transition of the judged values based on the stored judged values, a judging means for determining a decrease in tire air-pressure based on the judged values, and an alarming means for issuing preliminary alarm prior to issuing a predetermined alarm for informing decrease in internal pressure based on the transition of the judged values in case the judged value tends to move to exceed a predetermined threshold for determining a decrease in internal pressure.

The control unit 2 comprises the judged value memory means, the buffer for accumulating judged values, the judged value calculating means, the transition calculating means and the judging means.

In the present embodiment, the judging means includes a circuit for setting a first threshold for issuing preliminary alarm which is smaller than the predetermined threshold and a second threshold for issuing preliminary alarm for indicating a predetermined number by which the judged values has consecutively exceeded the first threshold for issuing preliminary alarm.

The judging means further includes a first condition providing that the judged value is not less than the first threshold for issuing preliminary alarm and a second condition providing that an summed value which is accumulated in the judged value memory means is not less than a product of the first threshold for issuing preliminary alarm and the second threshold for issuing preliminary alarm. The alarming means further includes a preliminary alarm circuit for adding, in case the first condition is met, the judged value to the judged value memory means while giving, in case the second condition is met, a command for issuing preliminary alarm.

In the rotational information detecting means 1, pulse signals corresponding to numbers of rotation of each tire Wi (hereinafter referred to as "wheel speed pulse") are outputted. In the CPU 2b, rotational angular velocities $F_i$ of the respective tires Wi are calculated at predetermined sampling periods $\Delta T$(sec), for instance, every $\Delta T$ of 1 second based on the wheel speed pulse outputted from the rotational information detecting means 1.

Since tires Wi are manufactured to include variations (initial differences) within specifications, effective rolling radii of respective tires Wi (values obtained by dividing a distance which has been traveled through a single rotation of the tire by $2\pi$) are not necessarily identical even though all of the tires Wi are at normal internal pressure. This might lead to variations in rotational angular velocities Fi of the respective tires Wi. For canceling such variations owing to initial differences, corrected rotational angular velocities $F1_i$ are calculated.

More particularly, the following corrections are made:

$Fl_1 = F_1$ $Fl_2 = mF_2$ $Fl_3 = F_3$ $Fl_4 = nF_4$

The correction coefficients m, n are obtained by calculating a rotational angular velocity $F_i$ under a condition, for instance, the vehicle is performing straight-ahead running and obtained as $m = F_1/F_2$ and $n = F_3/F_4$ on the basis of the calculated rotational angular velocity $F_i$.

The speed V of the vehicle is calculated using the following equation based on the $Fl_i$.

$$V = (V1 + V2 + V3 + V4)/4$$

Here, Vi: wheel speed of the tire (m/sec)
  i: 1=front left tire, 2=front right tire, 3=rear left tire, 4=rear right tire A decompression judged value (DEL) for detecting decrease in air-pressure of tire Wi is for comparing a difference of two diagonal sums of, for instance, the front tires and rear tires, and is obtained from the following equation (1) which is a ratio of a value obtained by subtracting a sum of signals of one pair of diagonally located wheels from a sum of signals of another pair of diagonally located wheels to an average value of the two sums:

$$DEL = \{((V1+V4)/2) - (V2+V3)/2\}/\{(V1+V2+V3+V4)/4\} \times 100 \ (\%) \quad (1)$$

In the present embodiment, the judged values are stored and summed, and a preliminary alarm is issued in case the transition of the judged values tends to move to exceed the threshold for decompression.

More particularly, a first threshold for issuing preliminary alarm Si and a second threshold for issuing preliminary alarm S2 are set in the period between calculation of judged values during running and issuing alarm upon determination of decompression in a predetermined manner, and the following first condition and second condition are set.

First condition: the judged value is not less than the first threshold for issuing preliminary alarm S1.

Second condition: the value of the buffer for accumulating judged values (summed value of judged values) is not less than a product of the first threshold for issuing preliminary alarm S1 and the second threshold for issuing preliminary alarm S2 (S1×S2).

Since the judged value will be zero in case the respective tires are at normal air-pressure, fluctuations in judged values will not be large. Thus, the first threshold for issuing preliminary alarm S1 is set to be a value which is smaller than the predetermined threshold S. Moreover, because it is possible to determine that the air-pressure of a tire is in a decreasing tendency depending on the number of consecutive times in which the judged values exceed the first threshold for issuing preliminary alarm S1, the second threshold for issuing preliminary alarm S2 might represent a degree thereof. For instance, in case the sampling time for the wheel speed is set to be 5 seconds, judged values will be calculated at a frequency of once per each 5 seconds, and considering a case in which judged values indicating decompression, for instance, approximately %10 of judged values indicating decompression are consecutively calculated within at least one minute (60 seconds), the second threshold for issuing preliminary alarm S2 (degree) might be set to 12 (=60/5).

Figure 3:
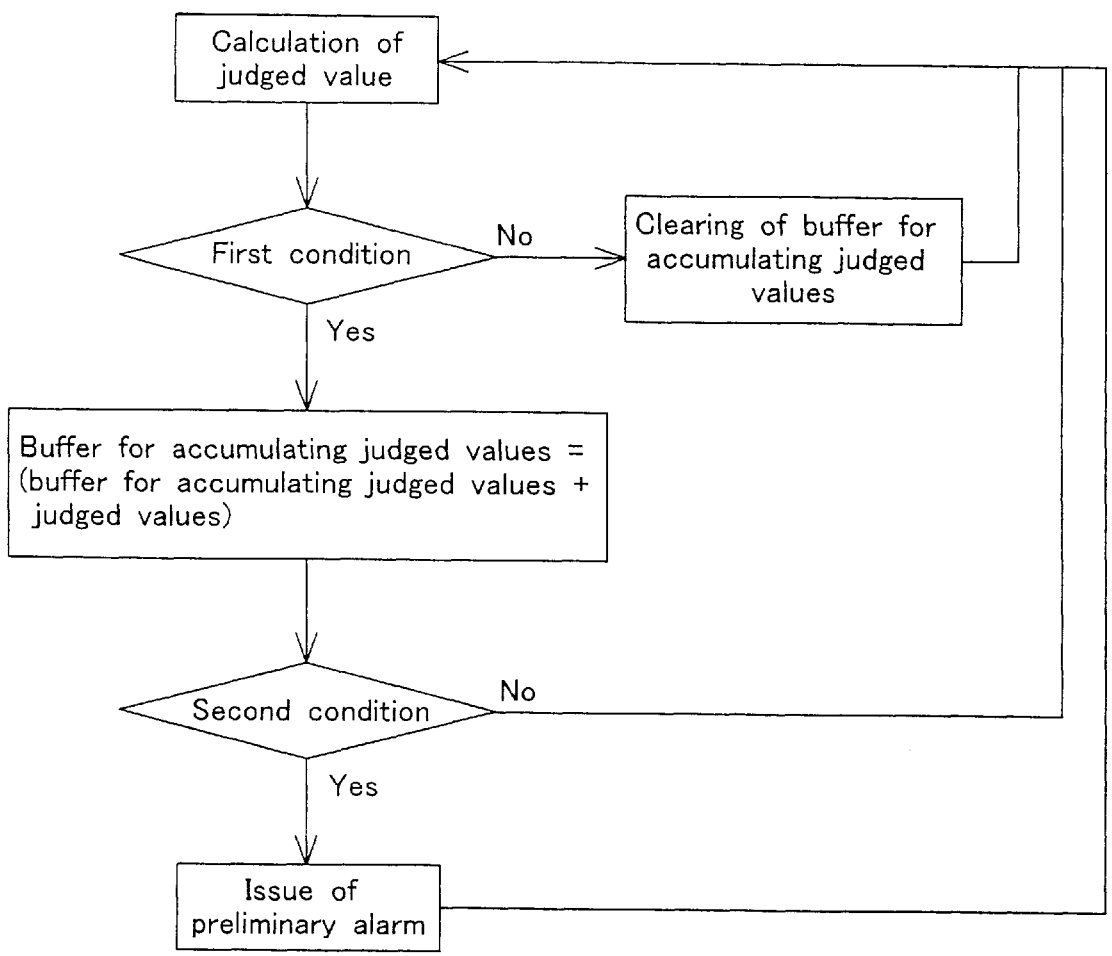
FIG. 3 is a flowchart related to one embodiment of the present invention.

In case the first condition is met as illustrated in FIG. 3, the judged values are added to the buffer for accumulating judged values and in case the first condition is not met, the buffer for accumulating judged values is cleared (set to zero). Judging decompression is continuously repeated thereafter.

In case the second condition is met thereafter, a preliminary alarm is issued since it might be determined that the transition of the judged values tends to move to exceed the predetermined threshold of decompression S.

With this arrangement, opportunities in which the driver of the vehicle can cope with a decrease in internal pressure of a tire can be increased so that the driver can fill some air in a repair shop or exchange the tire without being in haste and thus to perform safe driving.

While the present invention will now be explained based on an example thereof, the present invention is not limited to such an example.

EXAMPLE

A Mercedes Benz of A Class type vehicle (A160) equipped with tires (tire sizes: 185/65R15) of normal air-pressure ($21.6 \times 10^4$ Pa) was provided. In judging decompression of a tire, the sampling time for the wheel speed was set to 5 seconds while the predetermined threshold S was set to 0.125, the first threshold for issuing preliminary alarm S1 to 0.08 and the second threshold for issuing preliminary alarm S2 to 12.

Running tests were then performed upon decompressing the internal pressure of the right front tire by $10^4$ Pa (0.1 bar) per each minute.

It could accordingly be obtained a transition of judged values as illustrated in FIG. 4. In the present example, the judged values were accumulated in case these judged values were not less than the first threshold for issuing preliminary alarm 0.08 (S1), and in case judged value for issuing preliminary alarm, which is a sum of judged values, exceeded a product of the first threshold for issuing preliminary alarm 0.08 (S1) and the second threshold for issuing preliminary alarm 12(S2), namely 0.96, it was further determined that the tire tends to move to exceed the predetermined threshold S, and preliminary alarm was accordingly issued after 374 seconds (6.23 minutes) from the start of running. A normal alarm for indicating decompression which is based on the predetermined threshold was issued 60 seconds later, that is, after 434 seconds (7.23 minutes) from the start of running.

As explained so far, it is possible to appropriately inform the driver of the vehicle of a decompressed condition of a tire for making the driver drive safely.

What is claimed is:

1. An apparatus for alarming decrease in tire air-pressure for alarming decrease in tire air-pressure based on rotational information obtained from tires attached to a vehicle, comprising: a rotational information detecting means for detecting rotational information of the respective tires; a rotational information memory means for storing the rotational information of the respective tires; a judged value calculating means for calculating judged values based on the rotational information of the respective tires; a judged value memory means for storing the judged values; a transition calculating means for calculating transition of the judged values based on the stored judged values; a judging means for determining a decrease in tire air-pressure based on the judged values; and an alarming means for issuing preliminary alarm prior to issuing a predetermined alarm for informing decrease in internal pressure based on the transition of the judged values in case the judged value tends to move to exceed a predetermined threshold for determining a decrease in internal pressure.

2. The apparatus of claim 1, wherein the judging means includes a circuit for setting a first threshold for issuing preliminary alarm which is smaller than the predetermined threshold and a second threshold for issuing preliminary alarm for indicating a predetermined number by which the judged values has consecutively exceeded the first threshold for issuing preliminary alarm.

3. The apparatus of claim 2, wherein the judging means further includes a first condition providing that the judged value is not less than the first threshold for issuing preliminary alarm and a second condition providing that an summed value which is accumulated in the judged value memory means is not less than a product of the first threshold for issuing preliminary alarm and the second threshold for issuing preliminary alarm, and wherein the alarming means further includes a preliminary alarm circuit for adding, in case the first condition is met, the judged value to the judged value memory means while giving, in case the second condition is met, a command for issuing preliminary alarm.

4. A method for alarming decrease in tire air-pressure based on rotational information obtained from tires attached to a vehicle, comprising the steps of: detecting rotational information of the respective tires; storing the rotational information of the respective tires; calculating judged values based on the rotational information of the respective tires; storing the judged values; calculating transition of the judged values based on the stored judged values; determining a decrease in tire air-pressure based on the judged values; and issuing preliminary alarm prior to issuing a predetermined alarm for informing decrease in internal pressure based on the transition of the judged values in case the judged value tends to move to exceed a predetermined threshold for determining a decrease in internal pressure.

5. The method of claim 4, wherein, when issuing a preliminary alarm, there are used a first threshold for issuing preliminary alarm which is smaller than the predetermined threshold and a second threshold for issuing preliminary alarm for indicating a predetermined number by which the judged values has consecutively exceeded the first threshold for issuing preliminary alarm.

6. The method of claim 5, wherein there are set a first condition providing that the judged value is not less than the first threshold for issuing preliminary alarm and a second condition providing that an summed value which is accumulated in the judged value memory means is not less than a product of the first threshold for issuing preliminary alarm and the second threshold for issuing preliminary alarm, and wherein the judged value is stored and added in case the judged value meets the first condition, and then a preliminary alarm is issued in case the added value meets the second condition.

* * * * *